Aug. 18, 1942. J. R. LEX 2,293,511
WELDING TOOL
Filed Oct. 28, 1935 3 Sheets-Sheet 1

INVENTOR.
JOSEPH R. LEX
BY
Barnes, Kisselle, Laughlin & Raisch
ATTORNEYS

Aug. 18, 1942.    J. R. LEX    2,293,511
WELDING TOOL
Filed Oct. 28, 1935    3 Sheets-Sheet 2

INVENTOR.
JOSEPH R. LEX
ATTORNEYS.

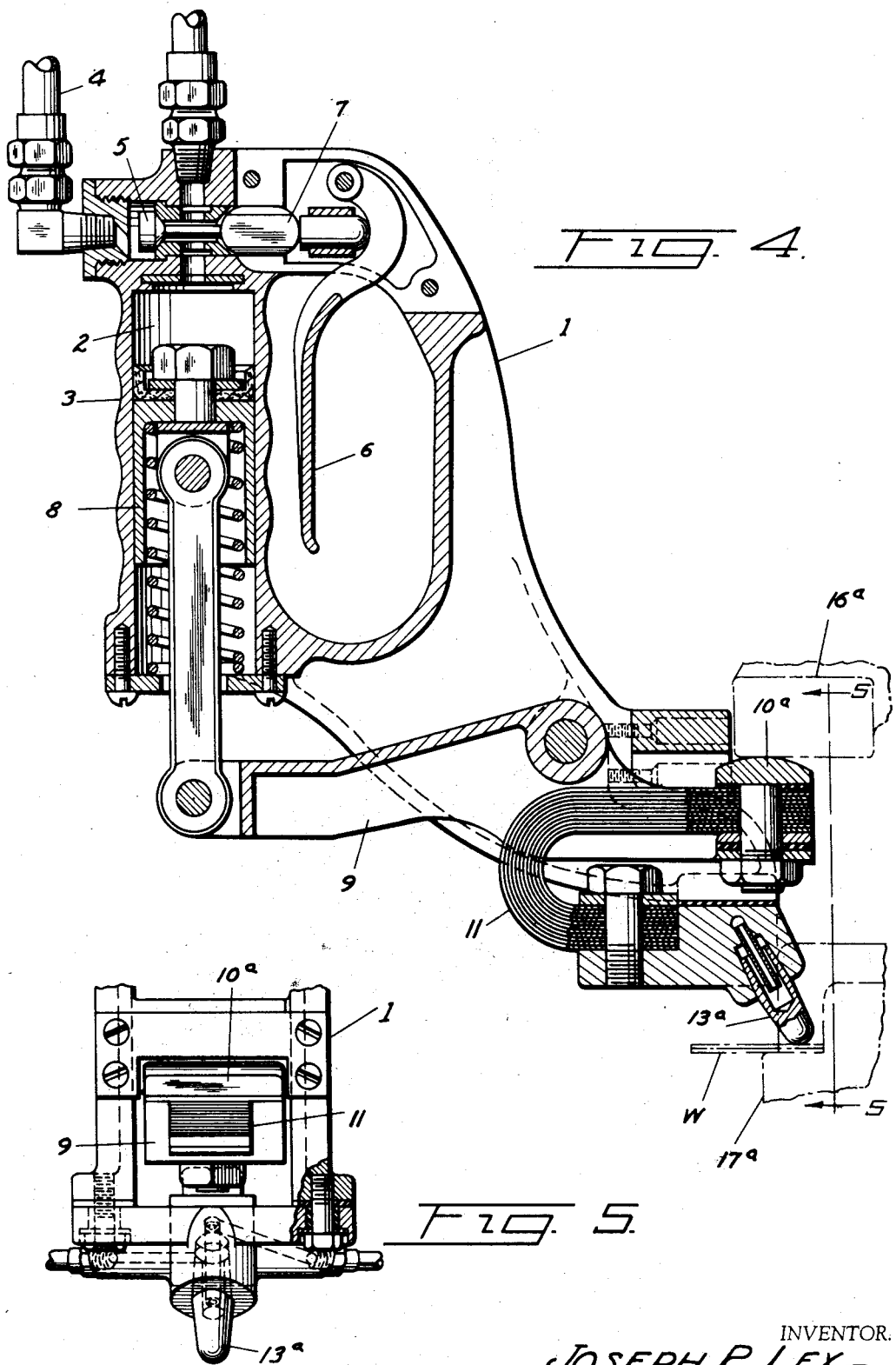

Patented Aug. 18, 1942

2,293,511

UNITED STATES PATENT OFFICE 2,293,511

WELDING TOOL

Joseph R. Lex, Detroit, Mich., assignor to General Motors Corporation, Detroit, Mich., a corporation of Delaware Application October 28, 1935, Serial No. 47,000

5 Claims. (Cl. 219—4)

This invention relates to welding tools and it is the object of the invention to provide an air controlled tool of minimum weight which can be used in so-called bar welding, that is, the tool is used to bridge between two conductors on one of which is the work to be welded.

Tools of this kind are not broadly new, but I believe my tool is an improvement over any as have heretofore been proposed in simplicity, lightness and in effectiveness of operation.

In the drawings:

Fig. 4 is a sectional view of a modified form of tool in which a bridging tool expands in place of contracting.

Fig. 5 is a section on the line 5—5 of Fig. 4.

Figure 1:
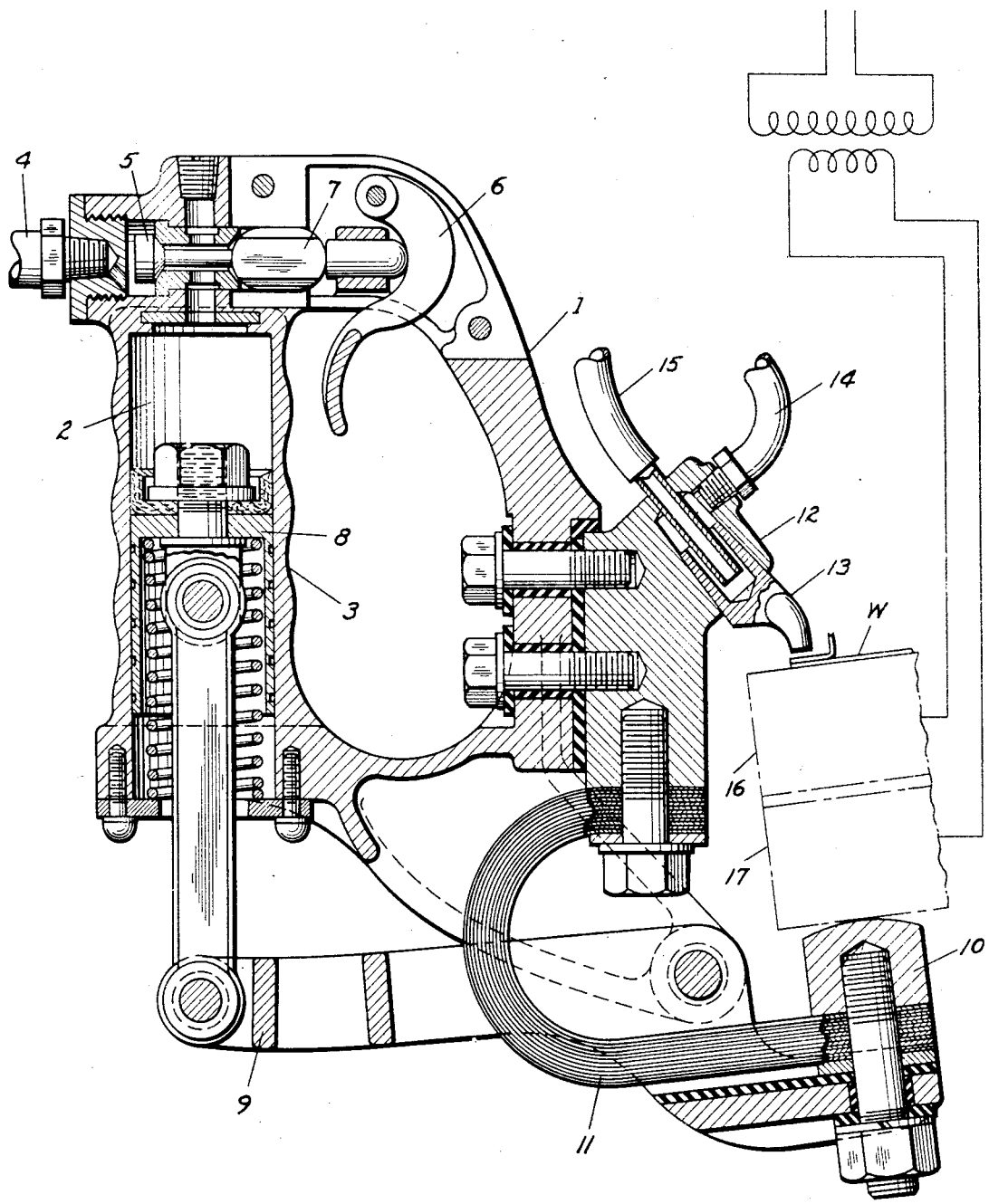
Fig. 1 is a section through the tool.

The frame of the tool is the aluminum casting 1. This casting includes an air cylinder 2, the exterior of which has shallow annular grooves 3 to provide a suitable hand grip. The air enters through the tube 4. An intake valve 5 is ordinarily kept closed on its seat by the air pressure. A pull on the trigger 6 closes the elliptical ball valve 7 on its seat and thrusts the inlet valve open, putting the air pressure behind the piston 8 which connects with the lever 9 which in turn carries a large copper contact 10 which is secured to the flexible laminated conductor 11 which in turn is bolted to the copper head 12 carrying a tapered socket in which the upper welding point 13 is driven. Conduits 14 and 15 provide the usual circulating cooling medium for the welding contact.

The work W lies on a copper table which has a heavy copper slab 16 insulated from a second heavy copper slab 17 upon which it rests.

Figs. 4 and 5 show the same general arrangement but here the tool is an expanding tool in place of a contracting tool. The descent of the piston 8 forces the contact 10a upwardly. The conductors 16a and 17a are on the outside of the tool in place of on the inside as is the case in the tool shown in Figs. 1-3 inclusive.

Figure 2:
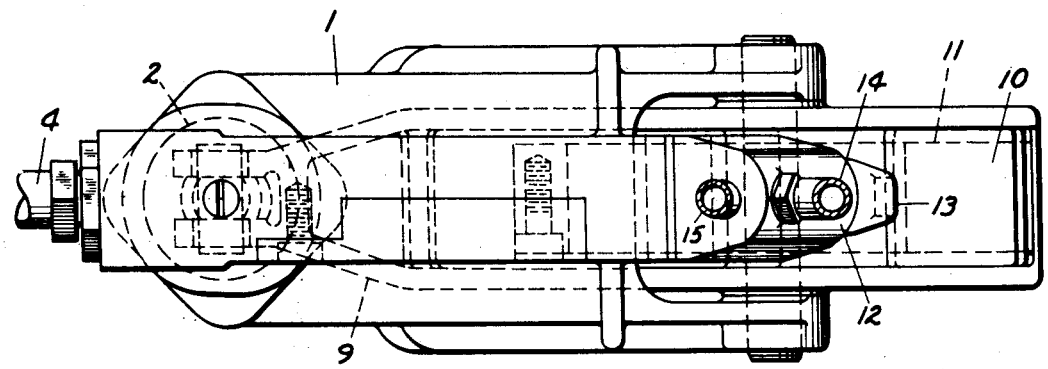
Fig. 2 is a top plan view of the tool.
Figure 3:
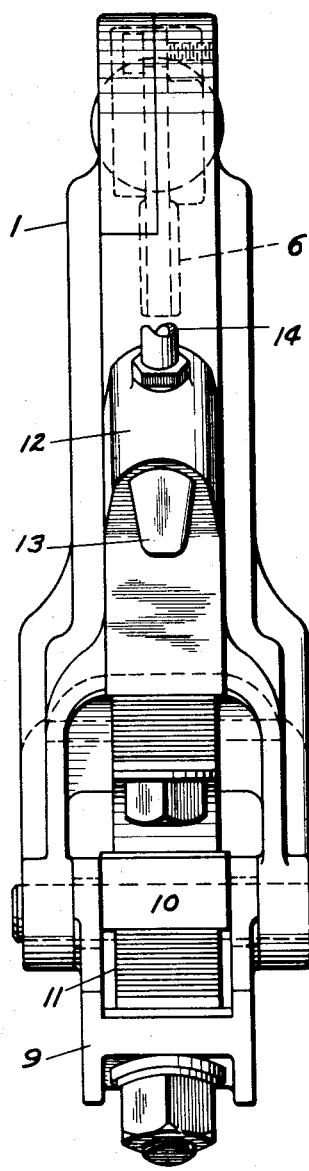
Fig. 3 is a front elevation of the tool.

The operation of the tool in Figs. 1-3 is as follows:

The work is laid on the work table. Conductor 16 is in circuit with a low tension, high amperage current as is also the conductor 17. The trigger 6 is pulled. This lets the air pressure in behind the piston. This causes the contact 10 to engage the conductor 17 and the welding point 13 to press upon the work. The current is now turned on and kept on for the measured fraction of a second, say two cycles in the sixty cycle current which is one-thirtieth of a second. Theoretically, this could be done by hand, but practically not. Various ways can be contrived to effect this, but preferably it is done by air pressure building up in the line when the contacts of the tool grip the work. This pressure can operate a suitable timing switch, not shown, which will turn on the current in the primary circuit and keep it on approximately the time desired. The primary induces the current in the secondary which circuit includes the conducting slabs 16 and 17 and a portion of the tool including the flexible cable 11 and the copper head 12. Inasmuch as the particular type of control is no part of this invention, it is not described nor illustrated. The air actuated current control is located at a remote point away from the tool so as not to burden the tool with its weight. The operation of the tool in Figs. 4 and 5 is the same, except the contacts expand onto the work instead of contracting onto the work.

It is of utmost importance to minimize the weight of the tool so that the operator can manipulate the tool without undue fatigue. This is accomplished by arranging the piston in the handle, constructing the whole frame 1 of aluminum, the lever 9 of aluminum bronze, and eliminating all the electric controls in the tool itself.

I am aware that it is old to use air operated bridging tools in bar welding, both those that expand to engage the work and one of the conductors, and those that contract upon a conductor and the work, but all of the tools with which I am familiar are relatively heavy tools and very difficult to manipulate. My tool is quite an improvement in this direction.

Furthermore, it is a considerable improvement over the conventional portable spot welder in that it eliminates one of the great sources of weight in the usual portable spot welder. The portable spot welder ordinarily has to either carry the weight of a transformer or else the heavy secondary cables which usually have to be water cooled adding a very considerable weight to the tool. The heavy cables and the water jackets are completely eliminated. Furthermore, by laying the work directly on one of the large copper slabs, the welding current is greatly diffused on one side of the weld, thereby substantially eliminating all scars which is very desirable, as for instance, in welding the door overlap flange in an automobile door. The inside of the flange will be scarred but the outside not.

What I claim is:

1. In bar welding in which one conductor supports the work and a second conductor is closely adjacent to the said current conductor, but insulated therefrom, a bridging tool comprising a frame in which is located a handle forming an air cylinder, a contact arranged to engage one conductor, a work contact arranged to engage the work lying on the other conductor, one of said contacts being movable and a piston reciprocating in said cylinder and having connections with the movable contact for pressing the contacts together and on the work when air is turned into the air cylinder.

2. In bar welding in which one conductor supports the work and a second conductor is closely adjacent to the said current conductor but insulated therefrom, a bridging tool comprising a frame in which is located a handle forming an air cylinder, a contact arranged to engage one conductor, a work contact arranged to engage the work lying on the other conductor, one of said contacts being movable and a piston reciprocating in said cylinder, and a lever and connecting rod for communicating the movement of the piston to the movable contact to press the contacts upon the work and the conductor.

3. In bar welding in which one conductor supports the work and a second conductor is closely adjacent to the said current conductor but insulated therefrom, a bridging tool comprising a frame in which is located a handle forming an air cylinder, a contact arranged to engage one conductor, a work contact arranged to engage the work lying on the other conductor, one of said contacts being movable and a piston reciprocating in said cylinder, a lever and connecting rod for communicating the movement of the piston to the movable contact to press the contacts upon the work and the conductor, and a flexible cable connecting the contact on the end of the lever with the stationary work contact, the said cable and contacts insulated from the lever and the handle part of the tool.

4. In bar welding, a pair of conductors insulated one from the other, a bridging tool comprising a frame in which is located a handle forming a cylinder, a movable contact arranged to engage one conductor, a work-contact arranged to engage the work and connect the work to the other conductor, one of said contacts being movable relative to the other contact and a piston reciprocating in said cylinder and a lever part and connecting rod for communicating the movement of the piston to the movable contact to direct the current flow through the work and the conductors.

5. In bar welding in which two bar conductors are closely adjacent to each other but insulated one from the other, a bridging tool comprising a frame in which is located a handle forming a fluid cylinder, a pair of contacts one moving relatively to the other for establishing a circuit through the conductors, the work and the tool, and a piston reciprocating in said cylinder and having connections with the movable contact for moving the contact to establish this circuit when fluid is turned into the said cylinder.

JOSEPH R. LEX.